(12) United States Patent
Boyle et al.

(10) Patent No.: US 9,204,472 B1
(45) Date of Patent: *Dec. 1, 2015

(54) METHOD AND SYSTEM FOR DETECTION AND CORRECTION OF A WIFI LOGIN FAILURE

(71) Applicant: Joingo, LLC, San Jose, CA (US)

(72) Inventors: Stephen S. Boyle, Lincoln, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,322

(22) Filed: Apr. 8, 2014

Related U.S. Application Data (63) Continuation-in-part of application No. 14/102,445, filed on Dec. 10, 2013, now Pat. No. 8,989,166, which is a continuation of application No. 13/783,346, filed on Mar. 3, 2013, now Pat. No. 8,693,403.

(60) Provisional application No. 61/671,409, filed on Jul. 13, 2012.

(51) Int. Cl.
*H04W 4/00* (2009.01)
*H04W 76/02* (2009.01)

(52) U.S. Cl.
CPC ............ *H04W 76/02* (2013.01); *H04W 76/021* (2013.01); *H04W 76/027* (2013.01); *H04W 76/028* (2013.01)

(58) Field of Classification Search
USPC .......................................... 370/338
See application file for complete search history.

(56) References Cited

U.S. PATENT DOCUMENTS

| | | | |
|---|---|---|---|
| 7,568,107 | B1 | 7/2009 | Rathi et al. |
| 7,929,964 | B2 | 4/2011 | Arumi et al. |
| 8,625,796 | B1 * | 1/2014 | Ben Ayed ..................... 380/258 |
| 2004/0235455 | A1 | 11/2004 | Jiang |
| 2006/0212507 | A1 | 9/2006 | Clark et al. |
| 2007/0297358 | A1 * | 12/2007 | Chang et al. .................. 370/328 |
| 2009/0100024 | A1 | 4/2009 | Manesh et al. |
| 2009/0279492 | A1 * | 11/2009 | Montemurro ......... H04L 63/083 370/329 |
| 2009/0298426 | A1 * | 12/2009 | Helvick ....................... 455/41.1 |
| 2010/0329461 | A1 | 12/2010 | Duplessis et al. |
| 2011/0306386 | A1 * | 12/2011 | Centoza et al. ............. 455/552.1 |
| 2012/0036018 | A1 | 2/2012 | Feliciano et al. |
| 2012/0264444 | A1 | 10/2012 | Yu |
| 2014/0180777 | A1 * | 6/2014 | Moshrefi et al. ............. 705/14.4 |

* cited by examiner

*Primary Examiner* — Farah Faroul
(74) *Attorney, Agent, or Firm* — Clause Eight IPS; Michael Catania (57) ABSTRACT

A method and system for automatically connecting to a WiFi network is disclosed herein. The present invention provides a set of diagnostic steps that are undertaken automatically on a mobile communication device to identify this condition and generate a browser window so that the condition can be fixed and the mobile communication device can automatically access the Internet through an Internet access gateway.

12 Claims, 12 Drawing Sheets

METHOD AND SYSTEM FOR DETECTION AND CORRECTION OF A WIFI LOGIN FAILURE

CROSS REFERENCES TO RELATED APPLICATIONS

The Present Application is a continuation-in-part application of U.S. patent application Ser. No. 14/102,445 filed Dec. 10, 2013, which is a continuation application of U.S. patent application Ser. No. 13/783,346, filed on Mar. 3, 2013, which claims priority to U.S. Provisional Patent Application No. 61/671,409, filed on Jul. 13, 2012, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to WiFi connections for mobile communication devices. More specifically, the present invention relates to a method and system for detection and correction of a WiFI login failure for a mobile application.

2. Description of the Related Art

Mobile communication device end-users constantly face a particular problem when using a local WiFi connection with a mobile communication device. Many times, whether on an airplane, in a hotel room, or in another facility with a local WiFi connection, a user attempts to run an application on a mobile communication device and the application times-out. Upon inspection, the end-user determines that the signal strength is good and there is a connection to a local WiFi connection. Some end-users will try to start a browser of the mobile communication device to determine if there is something that needs to be agreed to or a login. Other end-users will be bewildered, and frustrated that they cannot access an application on the mobile communication device.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

BLUETOOTH LOW ENERGY (aka "BLE" or "BLUETOOTH LE") is a communication format from the Bluetooth Special Interest Group which uses the 2.4 gigaHertz band of BLUETOOTH technology but with a simpler modulation system that supports data pockets ranging from 8 to 27 octets, which are transferred at 1 Mbps.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

DHCP (Dynamic Host Configuration Protocol) is a standard network protocol defined by RFC 1541 that allows a server to dynamically distribute IP addressing and configuration information, such as the subnet mask and the default gateway, to clients upon client requests.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Wayfinding is defined as tracking an object within a predetermined space.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

The prior art has failed to provide a means for automatically determining and correcting a WiFi login failure.

BRIEF SUMMARY OF THE INVENTION

The present invention is provides a solution to the problem. The present invention provides for automatic detection and correction of a WiFI login failure for a mobile application. The present invention provides a set of diagnostic steps that are undertaken automatically on a mobile communication device to identify this condition within an application and generate a browser window inside the application so that the condition can be fixed and the application can continue without having to time-out and exit.

One aspect of the present invention is a method for detection and correction of an Internet access gateway login failure. The method includes accessing a network through an Internet access gateway for an action on a mobile communication device. The mobile communication device previously had accessed the network through the Internet access gateway and an Internet access gateway login procedure had been completed by an end user. The method also includes transmitting a HTTP request from the mobile communication device through the Internet access gateway. The method also includes determining on the mobile communication device that the HTTP request to a web address through the Internet access gateway is inaccessible. The method also includes determining on the mobile communication device that the mobile communication device is connected to the Internet access gateway. The method also includes determining on the mobile communication device that a subsequent Internet access gateway login must be completed by the end user to access the network. The method also includes generating a browser window on the mobile communication device to display a Internet access gateway login for the connection to the network on the mobile communication device to login to gain access to the network through the Internet access gateway.

The mobile communication device is preferably a mobile phone or a tablet computer.

A program of an operating system of the mobile communication device is preferably configured to determine on the mobile communication device that the HTTP request to the web address through the Internet access gateway is inaccessible, determine on the mobile communication device that the mobile communication device is connected to the Internet access gateway, determine on the mobile communication device that the subsequent Internet access gateway login must be completed by the end user to access the network, and generate a browser window on the mobile communication device to display the Internet access gateway login for the connection to the network on the mobile communication device to login to gain access to the network through the Internet access gateway.

Another aspect of the present invention is a system for automatically connecting to a WiFi network. The system includes a WiFi network, a mobile application for the WiFi Network, an authentication server connected to the WiFi Network, and an Internet access gateway. The mobile application is preferably configured to run on a mobile device. The mobile application is preferably configured to activate when the mobile device is within range of the WiFi network. The mobile device uses a proximity location technology to determine the range of the WiFi network. The mobile application is preferably configured to communicate with the authentication server over the WiFi network to authenticate a user of the mobile device and to receive an access policy credential. The mobile application is preferably configured to communicate with the Internet access gateway to transmit the access policy credential. The Internet access gateway is preferably configured to grant access to the Internet appropriate for the access policy credential.

The Internet access gateway is preferably positioned between the WiFi Network and the Internet.

The proximity location technology is preferably one of GPS, WiFi, and a BLUTOOTH low energy technology.

The authentication server is preferably one of an AAA Server, a radius server, a CRM, and a patron profile.

Yet another aspect of the present invention is a method for automatically connecting to a WiFi network. method includes activating a mobile application when a mobile device is within range of a WiFi network. The mobile device uses a proximity location technology to determine the range of the WiFi network. The mobile application is for the WiFi Network. The mobile application is preferably configured to run on the mobile device. The mobile application is preferably a native downloadable application. The method also includes communicating with an authentication server over the WiFi network to authenticate a user of the mobile device and to receive an access policy credential at the mobile application. The method also includes communicating with an Internet access gateway to transmit the access policy credential from the mobile application. The method also includes receiving access to the Internet from the Internet access gateway, wherein the access to the Internet is appropriate for the access policy credential.

Having briefly described the present invention, the above and further objects, features and advantages thereof will be recognized by those skilled in the pertinent art from the fol-

DETAILED DESCRIPTION OF THE INVENTION

Figure 1:
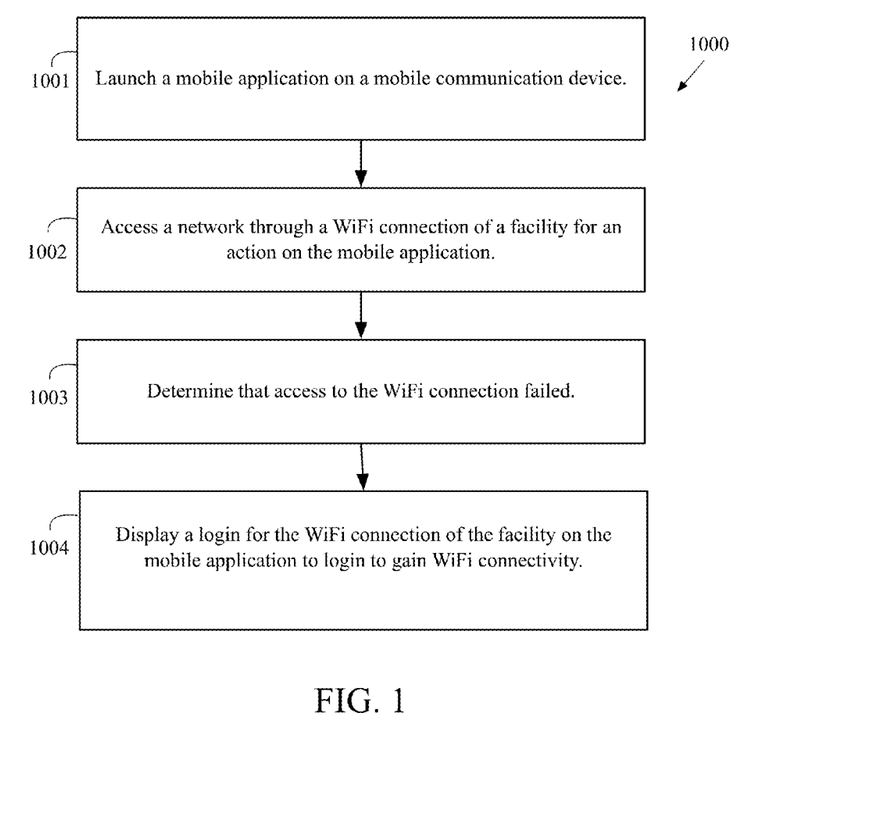
FIG. 1 is a flow chart for a method for WiFi login correction and detection.

A method 1000 for detection and correction of a WiFi login failure for a mobile application is shown in FIG. 1. At block 1001, a mobile application is launched on a mobile communication device. At block 1002, a network is accessed through a WiFi connection of a facility for an action on the mobile application. At block 1003, the mobile application determines that access to the WiFi connection of the facility on the mobile application has failed. At block 1004, a login for the WiFi connection of the facility is displayed on the mobile application to login to gain access to the WiFi connection.

Figure 2:
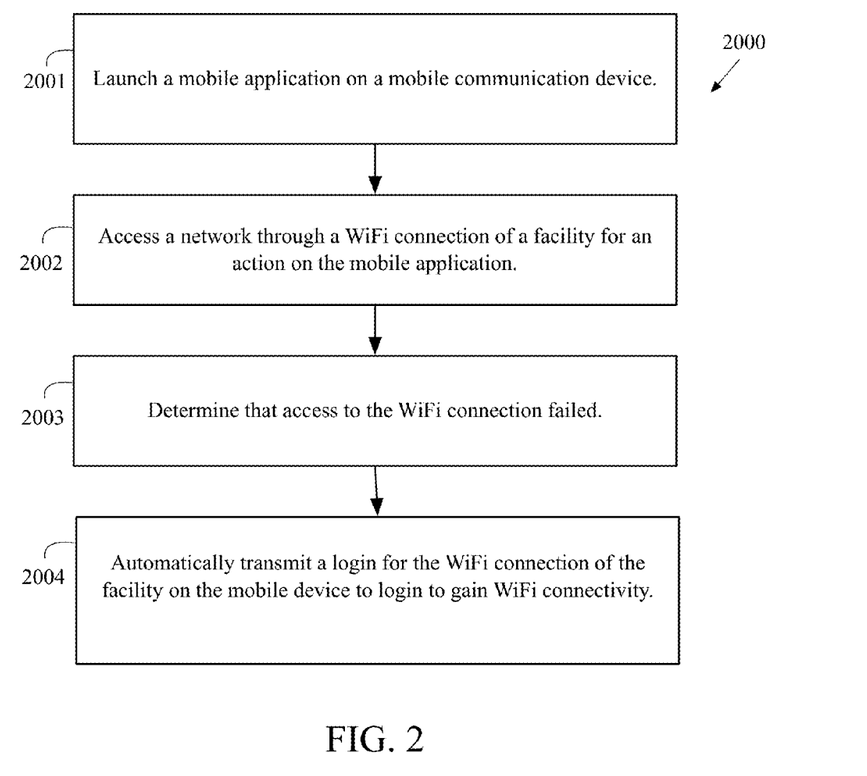
FIG. 2 is a flow chart for a method for WiFi login correction and detection.
Figure 3:
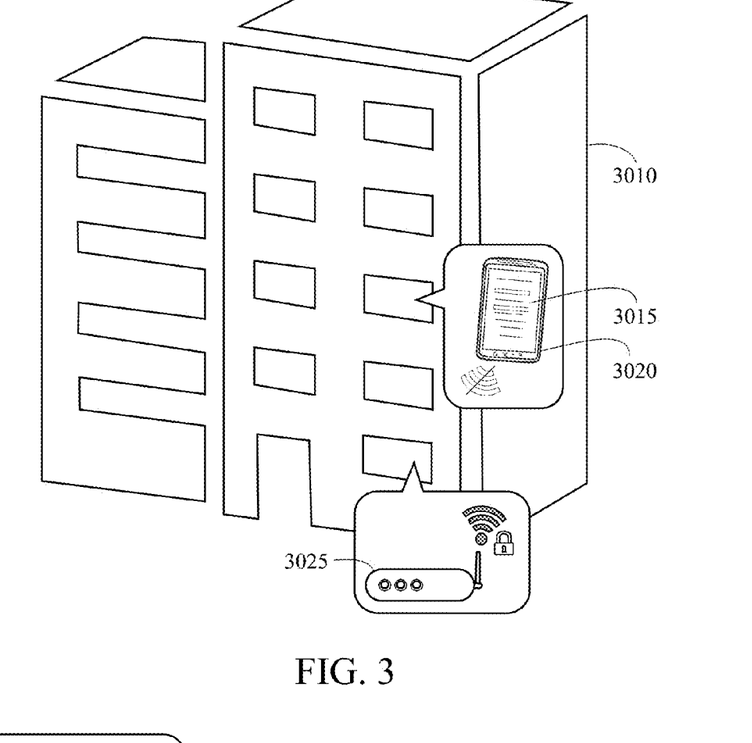
FIG. 3 is an illustration of a facility having a WiFi connection for mobile communication devices.
Figure 3A:
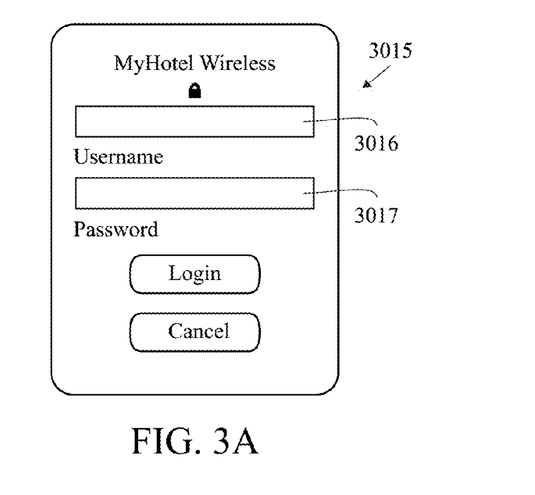
FIG. 3A is an illustration of a WiFi login for a mobile communication device.

A method 2000 for detection and automatic correction of a WiFi login failure for a mobile application is shown in FIG. 2. At block 2001, a mobile application is launched on a mobile communication device. At block 2002, a network is accessed through a WiFi connection of a facility for an action on the mobile application. At block 2003, the mobile application determines that access to the WiFi connection of the facility on the mobile application has failed. At block 2004, the mobile application automatically transmits a login for the WiFi connection of the facility for the mobile communication device to login to gain access to the WiFi connection.

Figure 4:
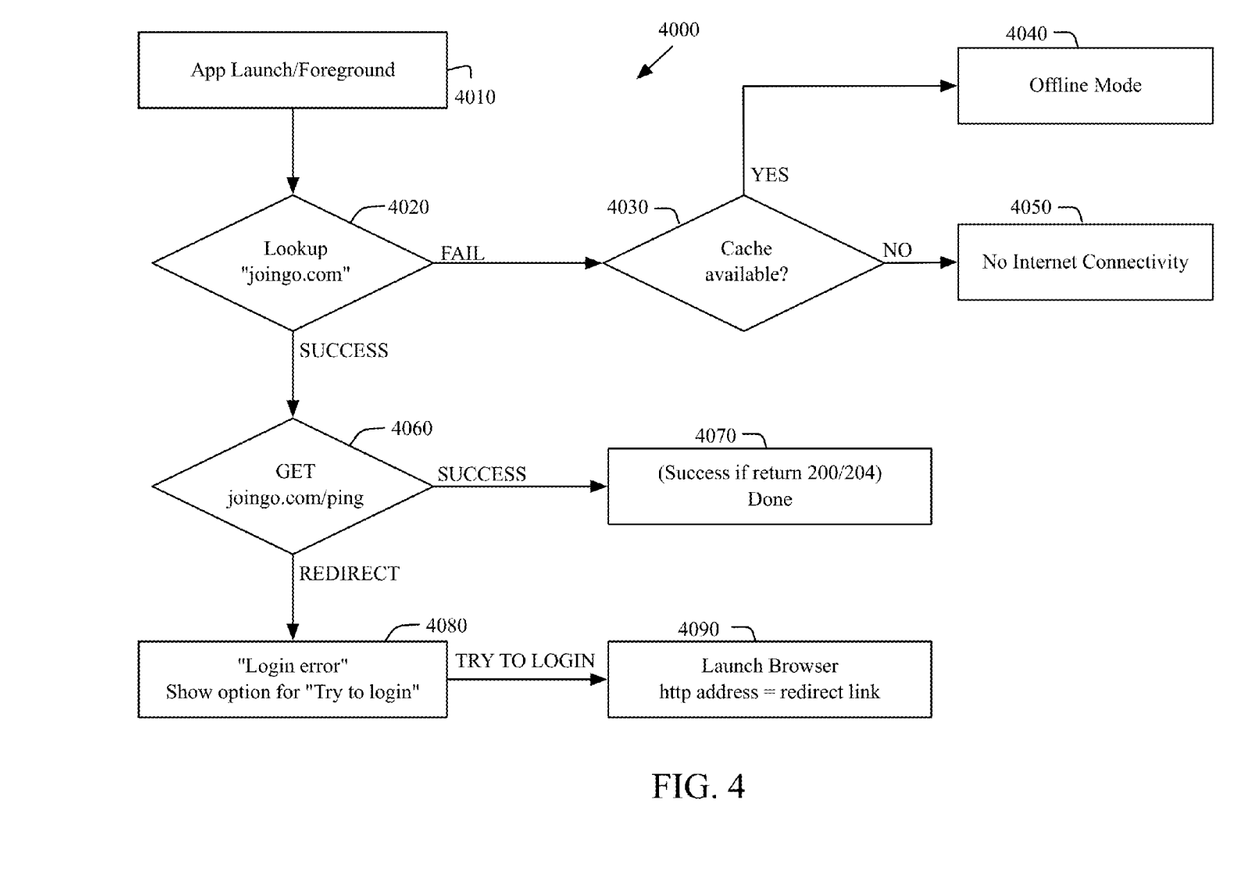
FIG. 4 is a block diagram of a flow chart for WiFi login failure detection and correction.

A flow chart of the logic of the present invention is illustrated in FIG. 4. The logic process 4000 begins with a mobile application launch on a mobile communication device at block 4010. At block 4020, the mobile application attempts to access a website, joingo.com, over a network through a WiFi connection at a facility. If accessing the website fails, at block 4030, an inquiry is made if a cache is available. If the cache is available, then at block 4040, the mobile application operates in an offline mode. If the cache is not available, then at block 6050 there is not Internet connectivity. However, if at block 4020 the access to joingo.com is successful, then at block 4060 a GET request is sent for joingo.com/ping. If the GET request is successful, then at 4070 the operation is done. However, if the GET request is redirected, then at block 4080 a login error is generated for the mobile application to have the end-user of the mobile communication device try to LOGIN. At block 4090, a browser of the mobile communication device is launched and the connection to the link is made over the network through the WiFi connection of the facility.

Figure 5:
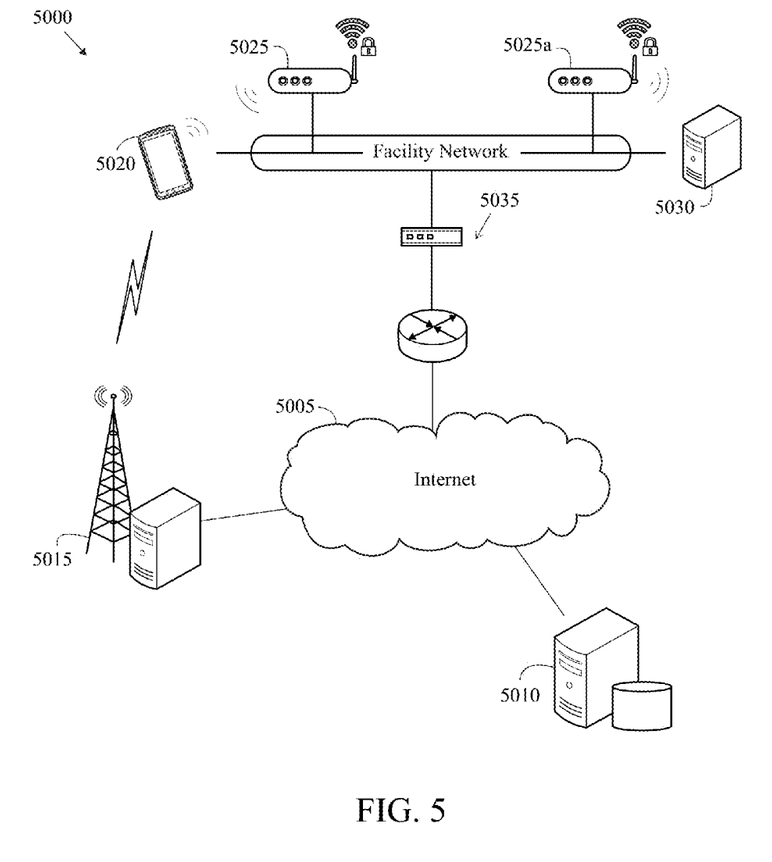
FIG. 5 is a block diagram of a system for WiFi login failure detection and correction.

A system 5000 for detection and correction of a WiFi login failure for a mobile application is shown in FIG. 5. The system 5000 includes a network 5005 such as the Internet, a third party server 5010, a mobile communication service provider 5015, a mobile communication device 5020, wireless access points 5025 and 5025a, a facility server 5030 and a firewall 5035 of a facility network. A mobile application is launched on the mobile communication device 5020. The mobile communication device 5020 accesses the facility network through a WAP 5025 for a WiFi connection of the facility network for an action on the mobile application. The mobile application determines that a link to a web address over the WiFi connection is inaccessible. The mobile application determines that the mobile communication device 020 is connected to the WiFi connection of the facility network. The mobile application also determines that a login must be completed. The mobile application displays a login for the WiFi connection of the facility on the mobile application to login to gain access to the WiFi connection of the facility network.

Figure 6:
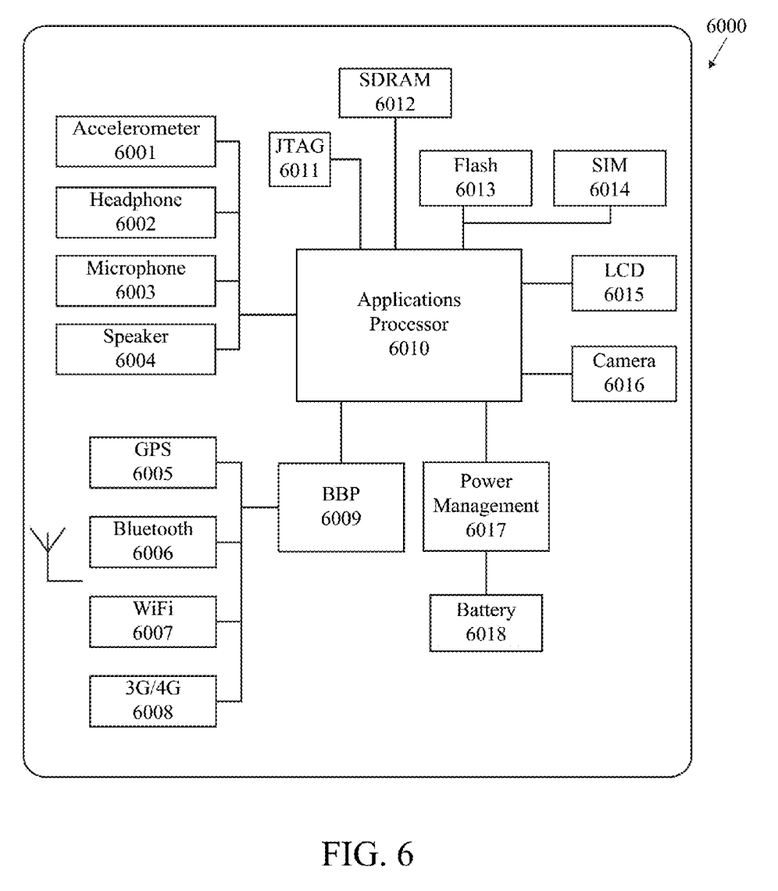
FIG. 6 is a block diagram of components of a mobile communication device.

As shown in FIG. 6, a typical mobile communication device 6000 includes an accelerometer 6001, a head phone 6002, a microphone 6003, a speak 6004, a GPS chipset 6005, a Bluetooth component 6006, a WiFi component 6007, a 3G/4G component 6008, a BaseBand Processor (for radio control) 6009, an applications processor 6010, a JTAG (debugger) 6011, a SDRAM memory 6012, a Flash memory 6013, SIM card 6014, LCD display 6015, a camera 6016, a power management circuit 6017 and a battery or power source 6018

The mobile communication devices 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., GALAXY S® smartphones from Samsung Electronics Co., Ltd, and many more. Examples of tablet computing devices include the IPAD® tablet from Apple Inc., and the GALAXY TAB® tablet from Samsung Electronics Co., Ltd.

Most of the interface descriptions preferably disclose use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol Secure ("HTTPS"), or other similar protocols.

The transmission protocol ranges from SIP to MGCP to FTP and beyond. The protocol at the game server 40 is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 7:
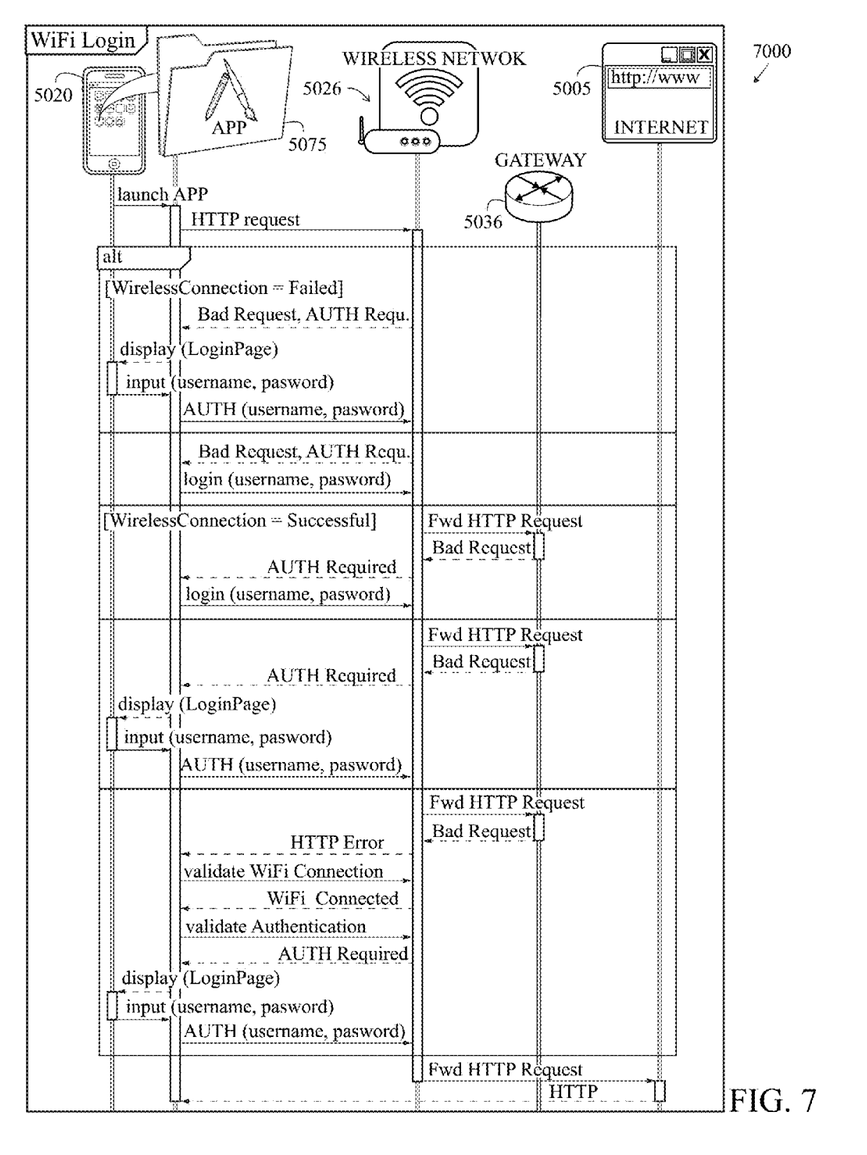
FIG. 7 is a sequence diagram for WiFi login failure detection and correction.

FIG. 7 illustrates a sequence diagram 7000 for detection and correction of a WiFi login failure for a mobile application. A mobile application 5072 is launched on a mobile communication device 5020. An HTTP request is sent to a wireless network 5026 of a facility. A wireless connection fails, and a bad request message is sent from the wireless network 5026 to the mobile communication device 5020. The app display a login page, to authenticate a username and password, and again a wireless connection fails, and a bad request message is sent from the wireless network 5026 to the mobile communication device 5020. The login is successful and the HTTP request is forward to a gateway (firewall or router) 5036. A wireless connection fails, and a bad request message is sent from the gateway 5036 to the mobile communication device 5020. An authentication message is sent to the device 5020, and the login is again attempted. HTTP error is sent to the mobile device 5020 from the wireless network 5026, and the WiFI connection is authenticated. A login page is displayed and the user enters his username and password. The login is authenticated and the HTTP request is forward to the Internet 5005.

Figure 8:
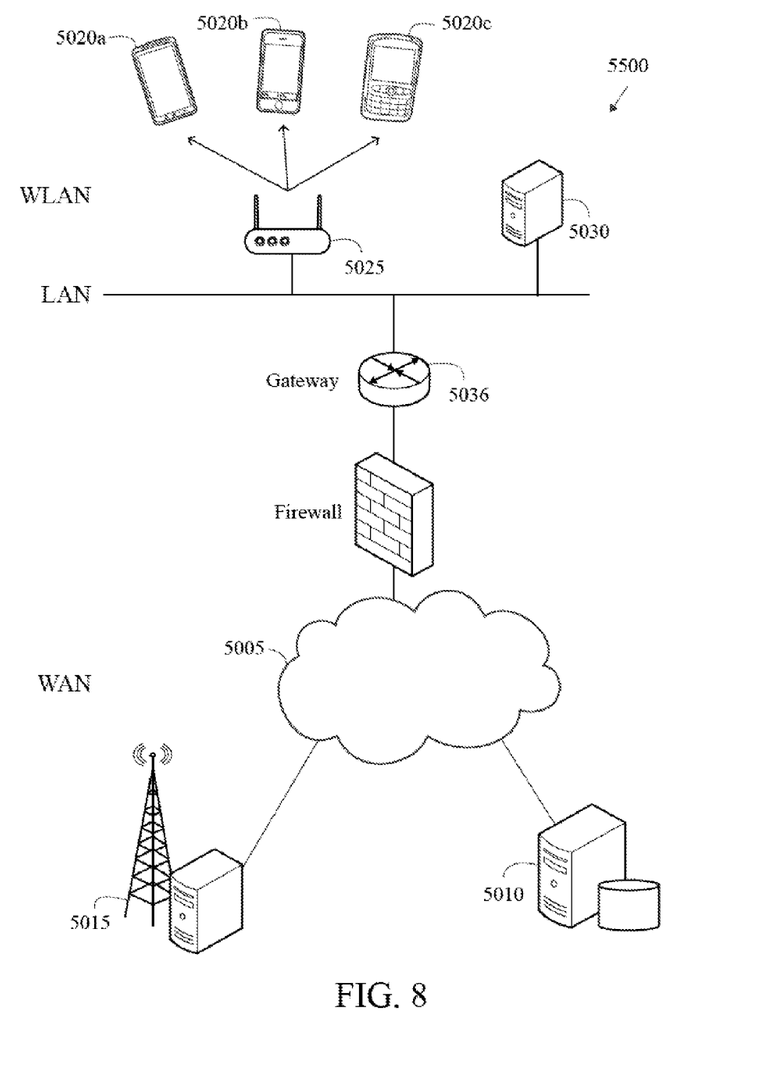
FIG. 8 is a block diagram of a system Internet access gateway login failure detection and correction.
Figure 9:
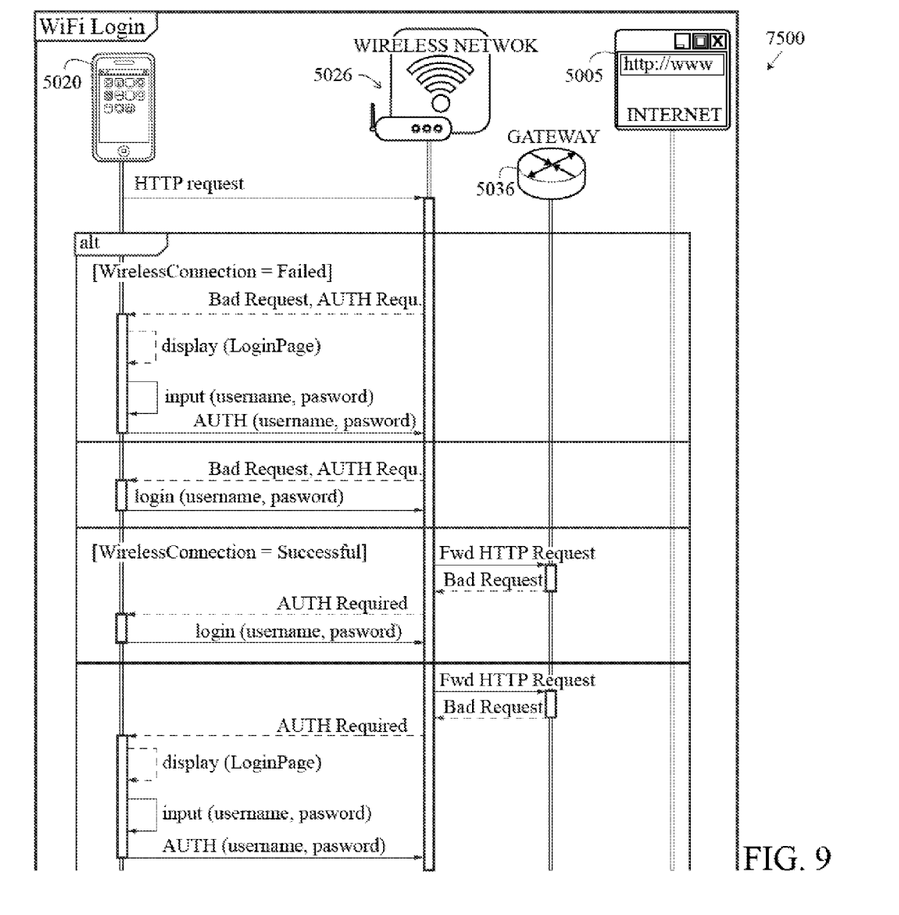
FIG. 9 is a communications sequence diagram for Internet access gateway login failure detection and correction.
Figure 9A:
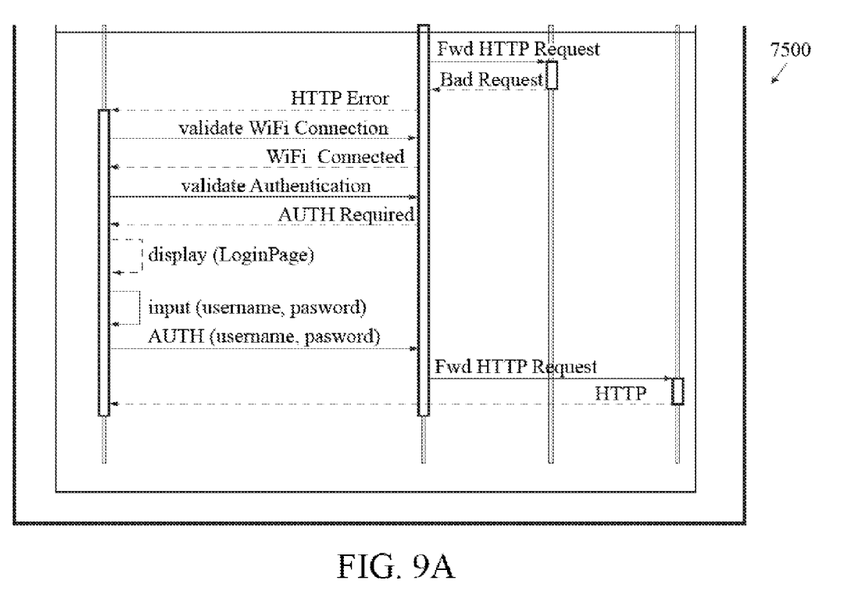
FIG. 9A is a continuation of the communication sequence diagram of FIG. 9.
Figure 10:
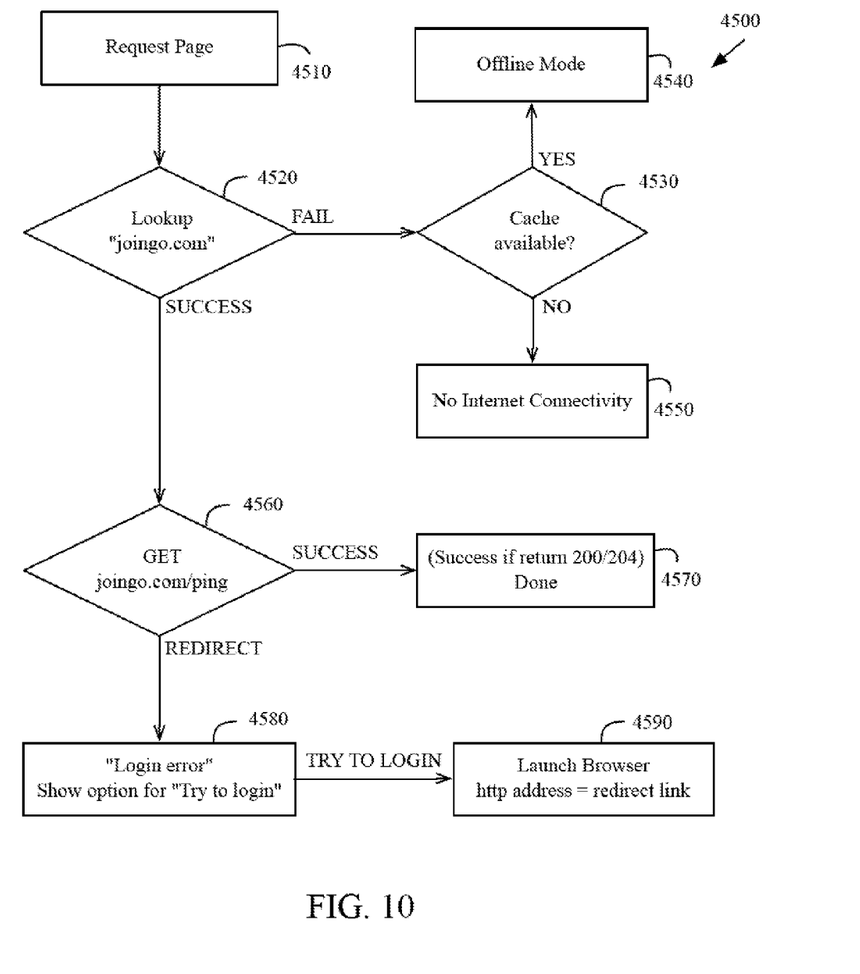
FIG. 10 is a block diagram of a flow chart for an Internet access gateway login failure detection and correction.

FIGS. 8-10 illustrate aspects of a system and method for detection and correction of an Internet access gateway login failure.

FIG. 8 is a block diagram of system for detection and correction of an Internet access gateway login failure. The system 5500 for detection and correction of an Internet access gateway login failure is shown in FIG. 8. The system 5500 includes a wireless LAN (WLAN), comprising a mobile communication device(s) 5020a-5020c, a wireless access point (WAP) 5025, a facility server 5030, and the facility LAN. The LAN connects to the WAN through a gateway 5036 and a firewall. The WAN includes the Internet 5005, a third party server 5010, and a mobile communication service provider 5015. For an action on the mobile communication device 5020a, 5020b, or 5020c, requiring Internet access, the device (s) 5020a-5020c connects wirelessly to the LAN via the WAP 5025. The LAN uses an Internet gateway 5036 to access the WAN.

FIG. 9 illustrates a sequence diagram 7500 for detection and correction of an Internet access gateway login failure. An HTTP request is sent to a wireless network 5026 of a facility. A wireless connection fails, and a bad request message is sent from the wireless network 5026 to the mobile communication device 5020. A login page is displayed, to authenticate a username and password, and again a wireless connection fails, and a bad request message is sent from the wireless network 5026 to the mobile communication device 5020. The login is successful and the HTTP request is forwarded to an internet gateway 5036. A wireless connection fails, and a bad request message is sent from the gateway 5036 to the mobile communication device 5020. An authentication message is sent to the device 5020, and the login is again attempted. An HTTP error is sent to the mobile device 5020 from the wireless network 5026, and the internet connection is authenticated. A login page is displayed and the user enters his username and password. The login is authenticated and the HTTP request is forwarded to the Internet 5005.

A flow chart of the logic of system and method for detection and correction of an Internet access gateway login failure is illustrated in FIG. 10. The logic process 4500 begins at block 4510 with a HTTP request from the mobile communication device for a request page. At block 4520, the mobile application attempts to access a website, joingo.com, over a network through a WiFi connection at a facility. If accessing the website fails, at block 4530, an inquiry is made if a cache is available. If the cache is available, then at block 4540, the mobile device operates in an offline mode. If the cache is not available, then at block 4550 there is not Internet connectivity. However, if at block 4520 the access is successful, then at block 4560 a GET request is sent for the request page. If the GET request is successful, then at 4570 the operation is done. However, if the GET request is redirected, then at block 4580 a login error is generated for the mobile device to have the end-user of the mobile communication device try to LOGIN. At block 4590, a browser of the mobile communication device is launched and the connection to the link is made over the network through the Internet gateway access.

Figure 11:
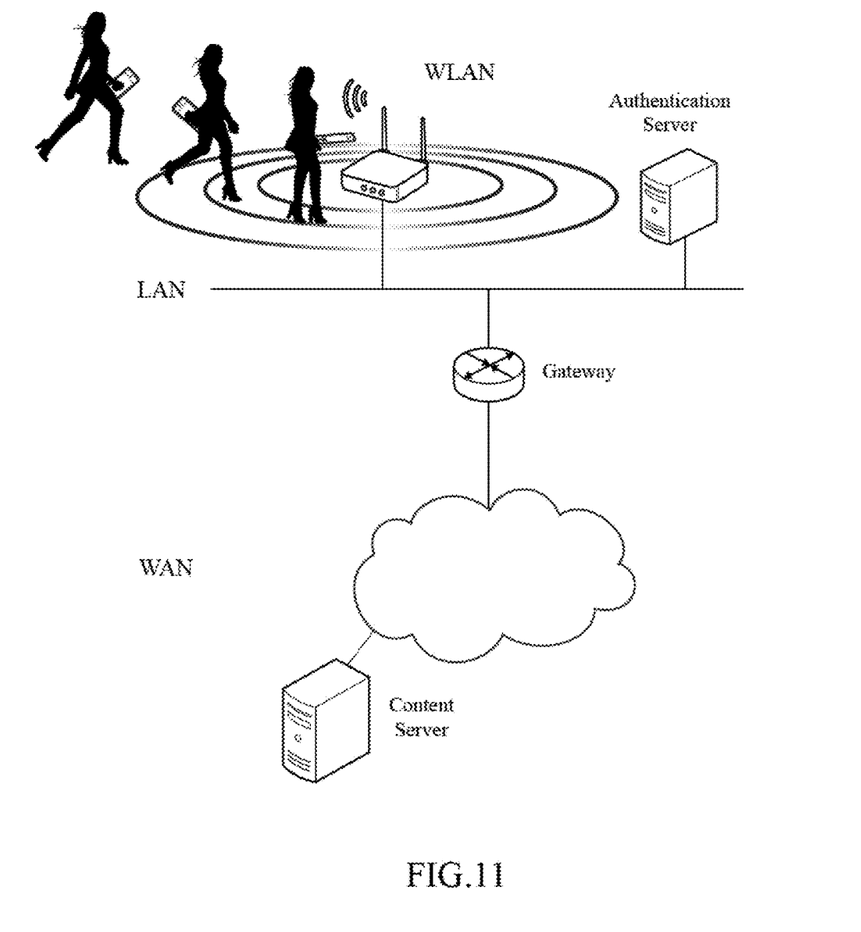
FIG. 11 is a block diagram of a system Internet access gateway login failure detection and correction.

FIG. 11 is a block diagram of system for detection and correction of an Internet access gateway login failure. a system for automatically connecting to a WiFi network. The system includes a WiFi network, a mobile application for the WiFi Network, an authentication server connected to the WiFi Network, and an Internet access gateway. The mobile application is preferably configured to run on a mobile device. The mobile application is preferably configured to activate when the mobile device is within range of the WiFi network. The mobile device uses a proximity location technology to determine the range of the WiFi network. The mobile application is preferably configured to communicate with the authentication server over the WiFi network to authenticate a user of the mobile device and to receive an access policy credential. The mobile application is preferably configured to communicate with the Internet access gateway to transmit the access policy credential. The Internet access gateway is preferably configured to grant access to the Internet appropriate for the access policy credential.

BLUETOOTH™ technology operates in the unlicensed 2.4 GHz band of the radio-frequency spectrum, and in a preferred embodiment each beacon 45 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43).

The present invention may be utilized with a marketing system such as disclosed in Boyle et al., U.S. patent application Ser. No. 13/671,538, filed on Nov. 7, 2012, for a Method And System For Personalized Venue Marketing, which is hereby incorporated by reference its entirety. The present invention may be utilized with a gaming system such as disclosed in Boyle, U.S. patent application Ser. No. 13/769,376, filed on Feb. 13, 2013, for a System And Method For Managing Games In A Mobile Virtual Casino, which is hereby incorporated by reference its entirety. The present invention may be utilized with a gaming system such as disclosed in Boyle, U.S. patent application Ser. No. 13/756,591, filed on Jan. 31, 2013, for a System And Method For Virtual Currency In A Virtual Casino, which is hereby incorporated by reference its entirety. The present invention may be utilized with a gaming system such as disclosed in Boyle, U.S. patent application Ser. No. 13/789,686, filed on Mar. 8, 2013, for a System And Method For Secure Play In A Mobile Virtual Casino, which is hereby incorporated by reference its entirety. The method and system of the present invention may be utilized with an anonymous loyalty program such as described in Boyle, U.S. Pat. No. 8,463,645, for an Anonymous Rewards Club Program, which is hereby incorporated by reference in its entirety. The method and system of the present invention may be utilized with the system described in Boyle et al., U.S. patent application Ser. No. 13/783,346, filed on Mar. 3, 2013, for a Method And System For Detection And Correction of Wi-Fi Login Failure, which is hereby incorporated by reference in its entirety. The method and system of the present invention may be utilized with the system described in Greer et al., U.S. patent application Ser. No. 13/775,226, filed on Feb. 24, 2013, for a Segmented Architecture Method And System, which is hereby incorporated by reference in its entirety. The method and system of the present invention may be utilized with the system described in Boyle, U.S. patent application Ser. No. 13/844,585 filed on Mar. 15, 2013, for a Method And System For Freemium WiFi Service, which is hereby incorporated by reference in its entirety. The method and system of the present invention may be utilized with the system described in Boyle, U.S. patent application Ser. No. 13/843,627 filed on Mar. 15, 2013, for a Method And System For Incentivizing On-Site Participation In Games And Offers which is hereby incorporated by reference in its entirety. The method and system of the present invention may be utilized with the system described in Boyle, U.S. patent application Ser. No. 13/974,040 filed on Aug. 22, 2013, for a Method And System For Including Content In A WiFi Stream, which is hereby incorporated by reference in its entirety. The method and system of the present invention may be utilized with the system described in Boyle, U.S. Pat. No. 8,583,777, for a Method And System For Providing Real-Time End-User WiFi Quality Data, which is hereby incorporated by reference in its entirety. The method and system of the present invention may be utilized with the system described in Boyle, U.S. patent application Ser. No. 14/145,740, filed Dec. 31, 2013, for a Method And System For Measuring The Quantity, Type And Transmission Quality Mobile Communication Devices Within A Defined Geographical Area, which is hereby incorporated by reference in its entirety. The method and system of the present invention may be utilized with the system described in Boyle, U.S. patent application Ser. No. 14/016,185, filed Sep. 2, 2013, for a Method And System For Wayfinding, which is hereby incorporated by reference in its entirety. The method and system of the present invention may be utilized with the system described in Boyle, U.S. Pat. No. 8,573,499, for a Quick Response Code Business Card, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A system for automatically connecting to a WiFi network, the system comprising:
 a WiFi network;
 a mobile application for the WiFi network, the mobile application configured to run on a mobile device, the mobile application configured for detection and correction of a WiFi login failure;
 an authentication server connected to the WiFi network; and
 an Internet access gateway;
 wherein the mobile device previously had accessed the WiFi network through the Internet access gateway and a WiFi login procedure had been completed by an end user;
 wherein the mobile application is configured to activate when the mobile device is within range of the WiFi network, the mobile device using a proximity location technology to determine the range of the WiFi network, wherein the proximity location technology is one of global positioning system (GPS), and a Bluetooth low energy technology;
 wherein the mobile application is configured to transmit a HTTP request over the WiFi network to a web address;
 wherein the mobile application is configured to determine that the HTTP request to a web address over the WiFi connection is inaccessible;
 wherein the mobile application is configured to determine that the mobile communication device is connected to the WiFi network;
 wherein the mobile application is configured to communicate with the authentication server over the WiFi network to authenticate a user of the mobile device and to receive an access policy credential;
 wherein the mobile application is configured to communicate with the Internet access gateway to transmit the access policy credential;
 wherein the Internet access gateway is configured to grant access to the Internet appropriate for the access policy credential.

2. The system according to claim 1 wherein the mobile device connects to the Internet and accesses content from a content server.

3. The system according to claim 1 wherein the Internet access gateway is positioned between the WiFi network and the Internet.

4. The system according to claim 1 wherein the authentication server is one of an authentication, authorization and accounting (AAA) Server, a radius server, a customer relationship management (CRM) database, and a patron profile.

5. The system according to claim 1 wherein mobile device is a mobile phone or tablet computer.

6. The system according to claim 1 wherein the mobile application is a program of an operating system of the mobile device.

7. A method for automatically connecting to a WiFi network, the system comprising:
 activating a mobile application when a mobile device is within range of a WiFi network, wherein the mobile device uses a proximity location technology to determine the range of the WiFi network, wherein the mobile application is for the WiFi network, and the mobile application is configured to run on the mobile device, wherein the mobile device previously had accessed the WiFi network through the Internet access gateway and a WiFi login procedure had been completed by an end user, wherein the proximity location technology is one of global positioning system (GPS), and a Bluetooth low energy technology;
 transmitting a HTTP request from the mobile application over the WiFi connection of the facility;

determining on the mobile application that the HTTP request to a web address over the WiFi connection is inaccessible;

determining on the mobile application that the mobile communication device is connected to the WiFi connection of the facility;

generating a browser window within the mobile application to display a WiFI login for the WiFi connection of the facility on the mobile application to login to gain access to the network through the WiFi connection;

communicating with an authentication server over the WiFi network to authenticate a user of the mobile device and to receive an access policy credential at the mobile application;

communicating with an Internet access gateway to transmit the access policy credential from the mobile application; and receiving access to the Internet from the Internet access gateway, wherein the access to the Internet is appropriate for the access policy credential.

8. The method according to claim 7 further comprising connecting to the Internet and accessing content from a content server.

9. The method according to claim 7 wherein the Internet access gateway is positioned between the WiFi network and the Internet.

10. The method according to claim 7 wherein the authentication server is one of an authentication, authorization and accounting (AAA) Server, a radius server, a customer relationship management (CRM) database, and a patron profile.

11. The method according to claim 7 wherein mobile device is a mobile phone or tablet computer.

12. The method according to claim 7 wherein the mobile application is a program of an operating system of the mobile device.

* * * * *